US009845691B2

(12) United States Patent
Allen et al.

(10) Patent No.: US 9,845,691 B2
(45) Date of Patent: Dec. 19, 2017

(54) TURBINE NOZZLE OUTER BAND AND AIRFOIL COOLING APPARATUS (71) Applicant: General Electric Company, Schenectady, NY (US)

(72) Inventors: Marshall Scott Allen, Amesbury, MA (US); Victor Hugo Silva Correia, Milton Hills, NH (US); Robert Proctor, West Chester, OH (US); Jared Peter Buhler, Tewksbury, MA (US)

(73) Assignee: General Electric Company, Schenectady, NY (US)

( * ) Notice: Subject to any disclaimer, the term of this patent is extended or adjusted under 35 U.S.C. 154(b) by 1293 days.

(21) Appl. No.: 13/662,284

(22) Filed: Oct. 26, 2012

(65) Prior Publication Data

US 2013/0309079 A1 Nov. 21, 2013

Related U.S. Application Data (60) Provisional application No. 61/639,474, filed on Apr. 27, 2012.

(51) Int. Cl.
*F01D 9/04* (2006.01)
*F01D 25/00* (2006.01)
*F01D 5/18* (2006.01)

(52) U.S. Cl.
CPC ............ *F01D 9/041* (2013.01); *F01D 5/189* (2013.01); *F01D 25/00* (2013.01);
(Continued)

(58) Field of Classification Search
CPC .... F01D 5/189; F01D 5/188; F05D 2260/201; F05D 2240/81
See application file for complete search history.

(56) References Cited

U.S. PATENT DOCUMENTS 3,844,343 A   10/1974  Burggraf
4,017,207 A    4/1977  Bell et al.
(Continued)

FOREIGN PATENT DOCUMENTS

JP    2009299601 A   12/2009
JP    2010255629 A   11/2010

OTHER PUBLICATIONS

Search Report and Written Opinion from corresponding PCT Application No. PCT/US2013/036524, dated Jun. 24, 2013.
(Continued)

*Primary Examiner* — Gregory Anderson
*Assistant Examiner* — Juan G Flores
(74) *Attorney, Agent, or Firm* — General Electric Company; William Scott Andes (57) ABSTRACT A turbine nozzle segment includes: an arcuate outer band segment; an airfoil-shaped turbine vane extending radially inward from the outer band segment, the turbine vane having a hollow interior; an impingement baffle assembly secured to the outer band so as to define an impingement cavity in cooperation with the outer band segment, wherein the impingement baffle assembly has at least one impingement hole formed therein which is arranged to direct cooling air at the outer band segment; and at least one impingement insert having at least one impingement hole formed therein disposed in the interior of the turbine vane, the impingement insert mating with an opening in the impingement baffle assembly such that the impingement baffle is isolated from direct fluid communication with the impingement cavity.

18 Claims, 5 Drawing Sheets

(52) U.S. Cl.
CPC .... *F05B 2230/237* (2013.01); *F05D 2240/81* (2013.01); *F05D 2260/201* (2013.01); *Y02T 50/676* (2013.01)

(56) References Cited

U.S. PATENT DOCUMENTS

| | | | |
|---|---|---|---|
| 4,688,988 A * | 8/1987 | Olsen | F01D 11/08 415/116 |
| 5,120,192 A | 6/1992 | Ohtomo et al. | |
| 5,160,241 A | 11/1992 | Glynn | |
| 5,609,466 A | 3/1997 | North et al. | |
| 5,630,700 A | 5/1997 | Olsen | |
| 5,634,766 A * | 6/1997 | Cunha | F01D 5/187 415/115 |
| 6,386,825 B1 | 5/2002 | Burdgick | |
| 6,413,040 B1 | 7/2002 | Yu et al. | |
| 6,416,284 B1 | 7/2002 | Demers et al. | |
| 6,543,993 B2 | 4/2003 | Burdgick et al. | |
| 6,652,220 B2 | 11/2003 | Powis et al. | |
| 7,007,488 B2 | 3/2006 | Orlando et al. | |
| 7,008,178 B2 | 3/2006 | Busch et al. | |
| 7,086,829 B2 | 8/2006 | Fuller et al. | |
| 8,251,652 B2 * | 8/2012 | Campbell | F01D 5/189 415/209.3 |
| 8,292,573 B2 | 10/2012 | Broomer et al. | |
| 2003/0131980 A1 | 7/2003 | Demarche et al. | |
| 2003/0180141 A1 | 9/2003 | Kress et al. | |
| 2004/0022630 A1 | 2/2004 | Tiemann | |
| 2004/0170498 A1 | 9/2004 | Peterman et al. | |
| 2008/0101923 A1 * | 5/2008 | Botrel | F01D 11/24 415/173.1 |
| 2010/0129196 A1 * | 5/2010 | Johnston | F01D 5/188 415/115 |
| 2010/0281879 A1 | 11/2010 | Shapiro et al. | |

OTHER PUBLICATIONS

Unofficial English Translation of Japanese Office Action issued in connection with corresponding JP Application No. 2015-509014 dated Oct. 13, 2015.

Unofficial English Translation of Notice of Allowance issued in connection with corresponding JP Application No. 2015509014 dated Jul. 18, 2017.

* cited by examiner

TURBINE NOZZLE OUTER BAND AND AIRFOIL COOLING APPARATUS

BACKGROUND OF THE INVENTION

This invention relates generally to gas turbine engine turbines and more particularly to methods for cooling turbine sections of such engines.

A gas turbine engine includes a turbomachinery core having a high pressure compressor, combustor, and high pressure turbine ("HPT") in serial flow relationship. The core is operable in a known manner to generate a primary gas flow. In a turbojet or turbofan engine, the core exhaust gas is directed through a nozzle to generate thrust. A turboshaft engine uses a low pressure or "work" turbine downstream of the core to extract energy from the primary flow to drive a shaft or other mechanical load.

The HPT includes annular arrays ("rows") of stationary vanes or nozzles that direct the gases exiting the combustor into rotating blades or buckets. Collectively one row of nozzles and one row of blades make up a "stage". Typically two or more stages are used in serial flow relationship. These components operate in an extremely high temperature environment, and must be cooled by air flow to ensure adequate service life. Typically, the air used for cooling is extracted from one or more points in the compressor. These bleed flows represent a loss of net work output and/or thrust to the thermodynamic cycle. They increase specific fuel consumption (SFC) and are generally to be minimized as much as possible.

Prior art HPT nozzles have been cooled either using a "spoolie" fed manifold cover or a continuous impingement ring with a spoolie-fed airfoil insert. For the first system, air is fed into a manifold above the outer band, and then flows into the airfoil without directly cooling the outer band. The second configuration utilizes a separate impingement ring to cool the outer band, but this flow is susceptible to leakage through the gaps between adjacent nozzle segments. In either case, the turbine nozzle cooling is less efficient than desired.

Accordingly, there is a need for cooling a turbine outer band and nozzle with minimal inter-segment leakage.

BRIEF SUMMARY OF THE INVENTION

This need is addressed by the present invention, which provides independent impingement cooling for individual turbine nozzle outer band segments.

According to one aspect of the invention, a turbine nozzle segment includes an arcuate outer band segment; an airfoil-shaped turbine vane extending radially inward from the outer band segment, the turbine vane having a hollow interior; an impingement baffle assembly secured to the outer band so as to define an impingement cavity in cooperation with the outer band segment, wherein the impingement baffle assembly has at least one impingement hole formed therein which is arranged to direct cooling air at the outer band segment; and at least one impingement insert having at least one impingement hole formed therein disposed in the interior of the turbine vane, the at least one impingement insert mating with an opening in the impingement baffle assembly such that the at least one impingement insert is isolated from direct fluid communication with the impingement cavity.

According to another aspect of the invention, a turbine nozzle assembly for a gas turbine engine includes: a plurality of turbine nozzle segments arranged in an annular array, each turbine nozzle segment including: an arcuate outer band segment; an airfoil-shaped turbine vane extending radially inward from the outer band segment, the turbine vane having a hollow interior; an impingement baffle assembly secured to the outer band so as to define an impingement cavity in cooperation with the outer band segment, wherein the impingement baffle assembly has at least one impingement hole formed therein which is arranged to direct cooling air at the outer band segment; and at least one impingement insert having at least one impingement hole formed therein disposed in the interior of the turbine vane, the at least one impingement baffle mating with an opening in the impingement baffle assembly such that the at least one impingement baffle is isolated from direct fluid communication with the impingement cavity; and an annular supporting structure surrounding the turbine nozzle segments.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
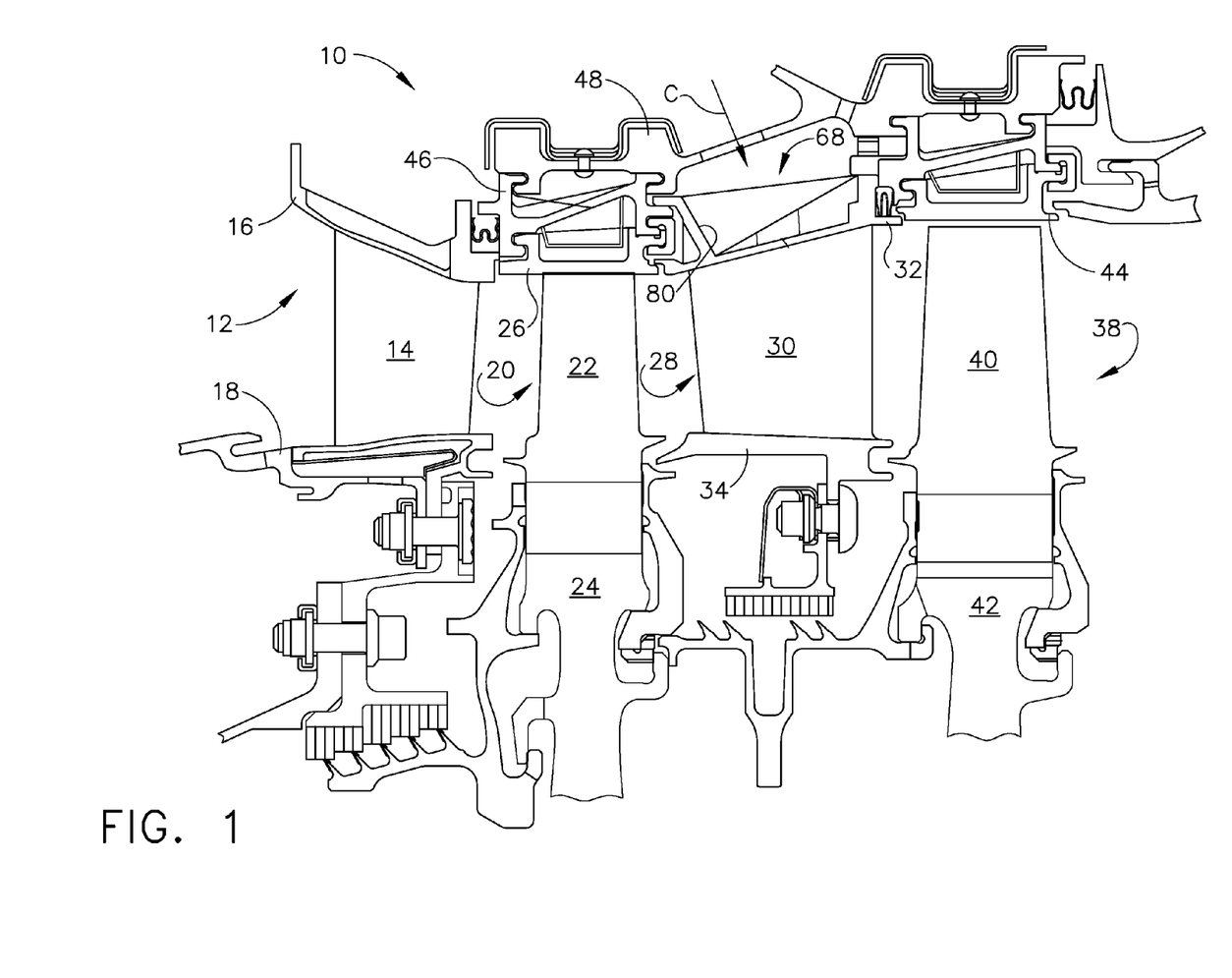
FIG. 1 is a cross-sectional view of a high pressure turbine section of a gas turbine engine, constructed in accordance with an aspect of the present invention.

Referring to the drawings wherein identical reference numerals denote the same elements throughout the various views, FIG. 1 depicts a portion of a high pressure turbine ("HPT") 10 which is part of a gas turbine engine of a known type. The function of the HPT 10 is to extract energy from high-temperature, pressurized combustion gases from an upstream combustor (not shown) and to convert the energy to mechanical work, in a known manner. The HPT 10 drives an upstream compressor (not shown) through a shaft so as to supply pressurized air to the combustor.

The principles described herein are equally applicable to turboshaft, turboprop, turbojet, and turbofan engines, as well as turbine engines used for other vehicles or in stationary applications.

The HPT 10 includes a first stage nozzle 12 which comprises a plurality of circumferentially spaced airfoil-shaped hollow first stage vanes 14 that are supported between an arcuate, segmented first stage outer band 16 and an arcuate, segmented first stage inner band 18. The first stage vanes 14, first stage outer band 16 and first stage inner band 18 are arranged into a plurality of circumferentially adjoining nozzle segments that collectively form a complete 360° assembly. The first stage outer and inner bands 16 and 18 define the outer and inner radial flowpath boundaries, respectively, for the hot gas stream flowing through the first stage nozzle 12. The first stage vanes 14 are configured so as to optimally direct the combustion gases to a first stage rotor 20.

The first stage rotor 20 includes an array of airfoil-shaped first stage turbine blades 22 extending outwardly from a first stage disk 24 that rotates about the centerline axis of the engine. A segmented, arcuate first stage shroud 26 is arranged so as to closely surround the first stage turbine blades 22 and thereby define the outer radial flowpath boundary for the hot gas stream flowing through the first stage rotor 20.

A second stage nozzle 28 is positioned downstream of the first stage rotor 20, and comprises a plurality of circumferentially spaced airfoil-shaped hollow second stage vanes 30 that are supported between an arcuate, segmented second stage outer band 32 and an arcuate, segmented second stage inner band 34. The second stage vanes 30, second stage outer band 32 and second stage inner band 34 are arranged into a plurality of circumferentially adjoining nozzle segments 36 (see FIG. 3) that collectively form a complete 360° assembly. The second stage outer and inner bands 32 and 34 define the outer and inner radial flowpath boundaries, respectively, for the hot gas stream flowing through the second stage turbine nozzle 34. The second stage vanes 30 are configured so as to optimally direct the combustion gases to a second stage rotor 38.

The second stage rotor 38 includes a radial array of airfoil-shaped second stage turbine blades 40 extending radially outwardly from a second stage disk 42 that rotates about the centerline axis of the engine. A segmented arcuate second stage shroud 44 is arranged so as to closely surround the second stage turbine blades 40 and thereby define the outer radial flowpath boundary for the hot gas stream flowing through the second stage rotor 38.

The segments of the first stage shroud 26 are supported by an array of arcuate first stage shroud hangers 46 that are in turn carried by an arcuate shroud support 48, for example using the illustrated hooks, rails, and C-clips in a known manner.

The second stage nozzle 28 is supported in part by mechanical connections to the first stage shroud hangers 46 and the shroud support 48. Each second stage vane 30 is hollow so as to be able to receive cooling air in a known fashion.

Figure 2:
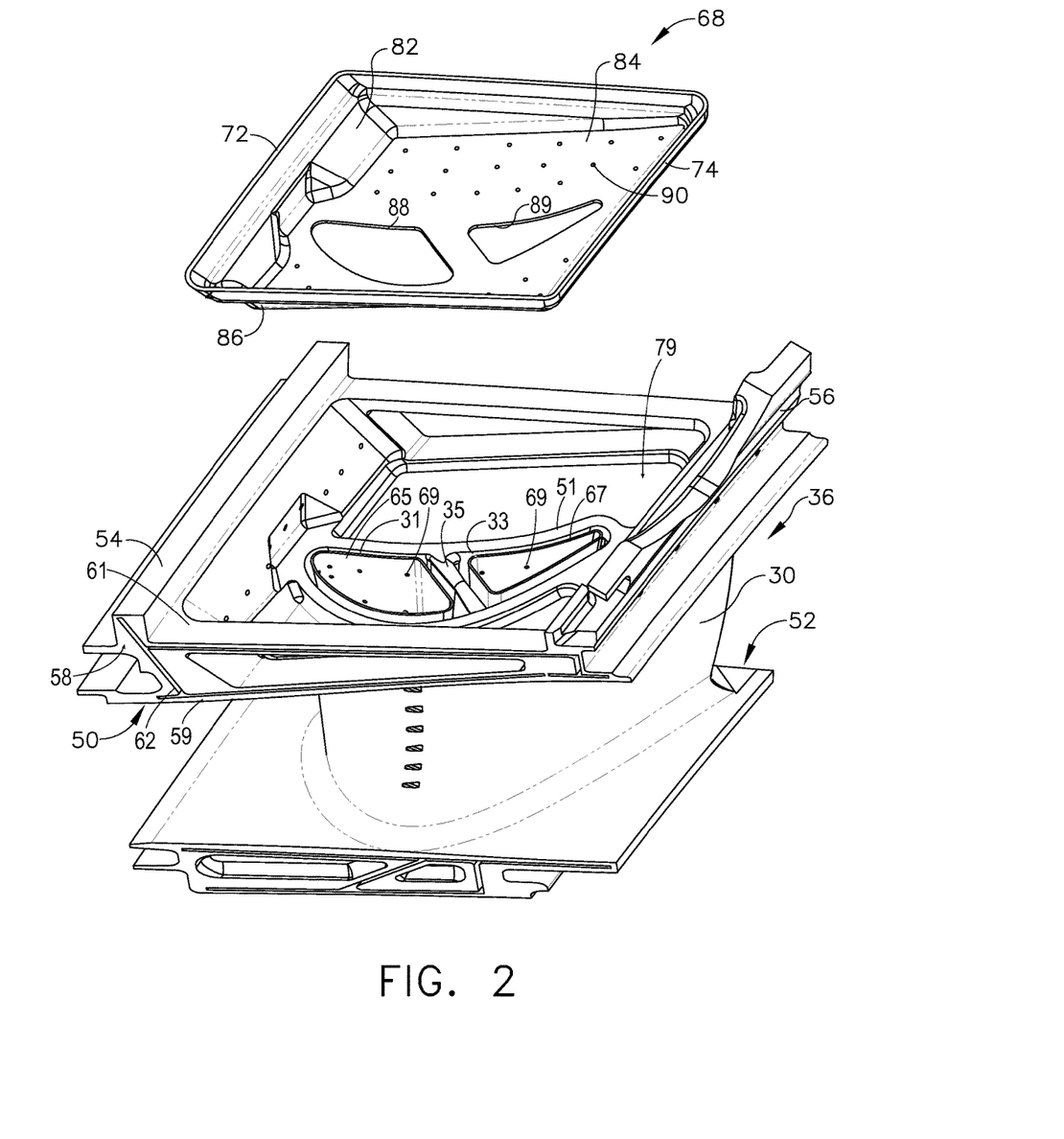
FIG. 2 is an exploded perspective view of a turbine nozzle shown in FIG. 1, with an impingement baffle assembly.
Figure 3:
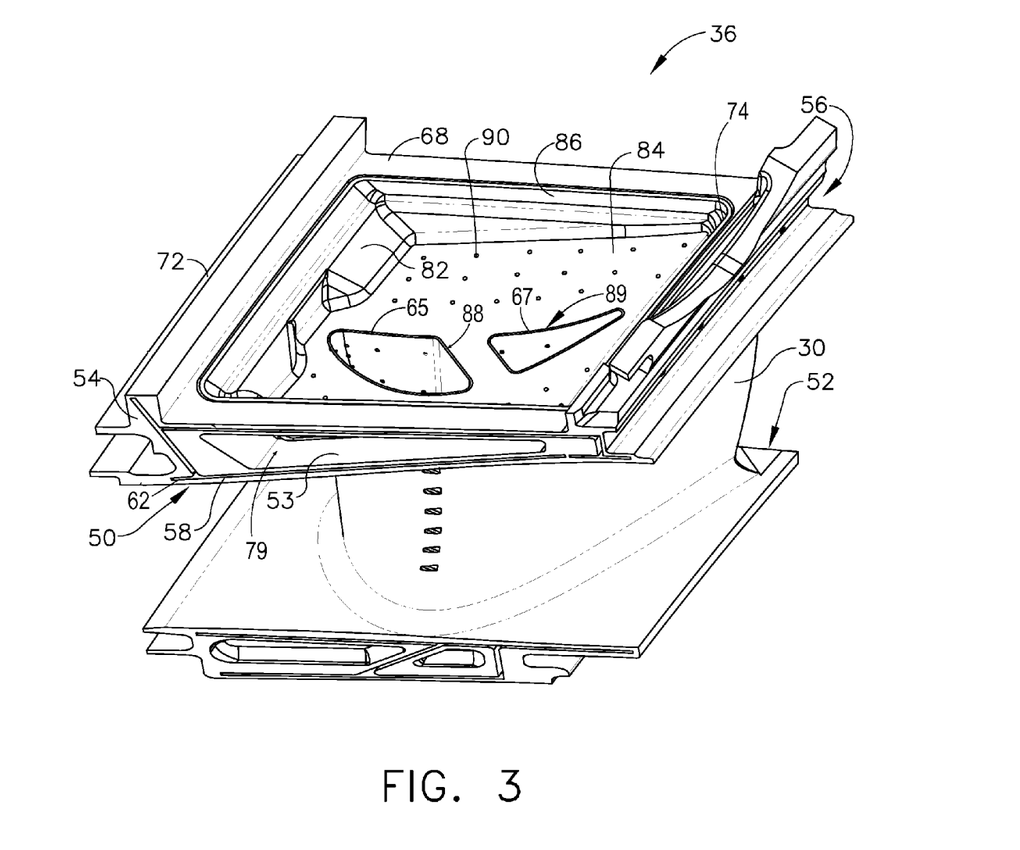
FIG. 3 is a perspective view of the turbine nozzle shown and impingement baffle assembly shown in FIG. 2, assembled together.

FIGS. 2-5 illustrate the construction of the second stage nozzle 28 in more detail. The second stage nozzle is used merely as an example, and the principles of the present invention are applicable to any turbine airfoil. FIG. 3 shows an individual nozzle segment 36. In the illustrated example, the nozzle segment 36 is a "singlet" casting which includes a segment 50 of the outer band 32, a segment 52 of the inner band 34, and a hollow second stage vane 30. The hollow interior of the second stage vane 30 is divided into forward and aft cavities 31 and 33 by a transverse septum 35. The outer band segment 50 includes a central portion 53, an arcuate, radially-outwardly-extending forward rail 54, and arcuate, radially-outwardly-extending aft rail 56. The central portion 53 includes a raised boss 51 that follows the cross-sectional shape of the second stage vane 30. The forward rail 54, the central portion 53, and the aft rail 56 all terminate at a common side face 58 on each lateral side of the outer band segment 50. Each side face 58 may incorporate radially inner and radially outer rails 59 and 61, respectively, with an open space or "window" therebetween. The side face 58 includes a pattern of seal slots 62 formed therein to receive a group of spline seals (not shown). In the illustrated example the seal slots 62 are arranged along the forward and aft rails 54 and 56 and the inner and outer rails 59 and 61 so as to define a four-sided, roughly rectangular shape with a closed perimeter. Spline seals are a known type of seal comprising a thin, flat strip of metal or other suitable material that is are sized to be received in the seal slots and have a width sufficient to span across a gap between adjacent nozzle segments 36 when installed in an engine.

Forward and aft impingement inserts 65 and 67 are disposed in the forward and aft cavities 31 and 33, respectively. Each impingement insert 65 and 67 is radially elongated and has a cross-sectional shape generally conforming to the shape of the respective cavity 31 or 33. A plurality of impingement holes 69 are formed through each impingement insert 65 and 67 As used herein, the term "impingement holes" refers to cooling holes whose size, shape, and location are intended to eject a jet of cooling air against an opposing surface, in distinction to, for example, dilution holes or film cooling holes.

Figure 4:
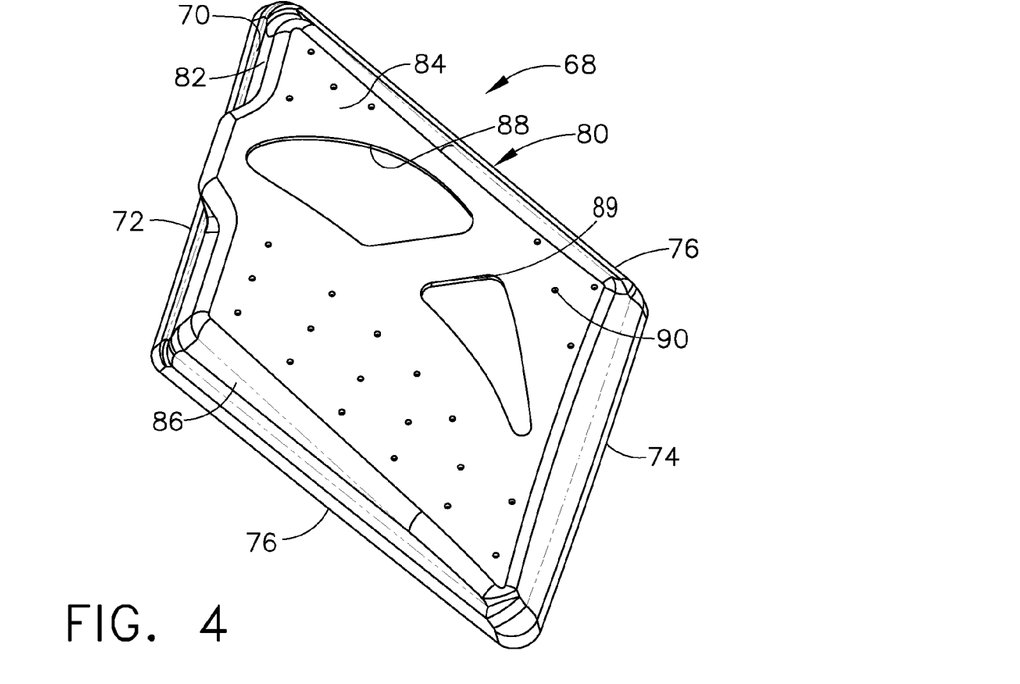
FIG. 4 is a first perspective view of an impingement baffle assembly.
Figure 5:
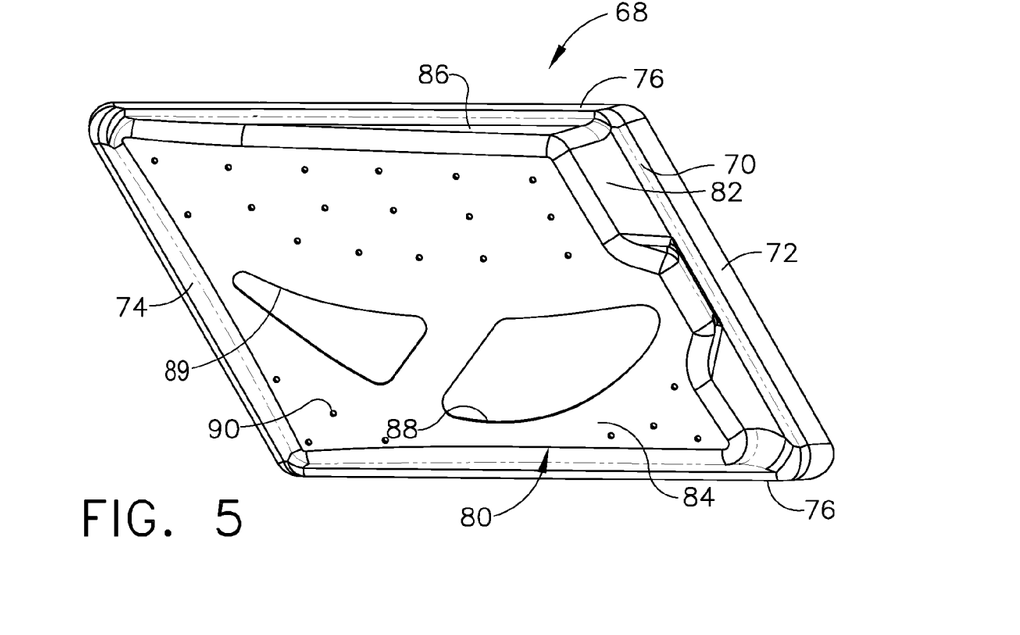
FIG. 5 is a second perspective view of an impingement baffle assembly.
Figure 6:
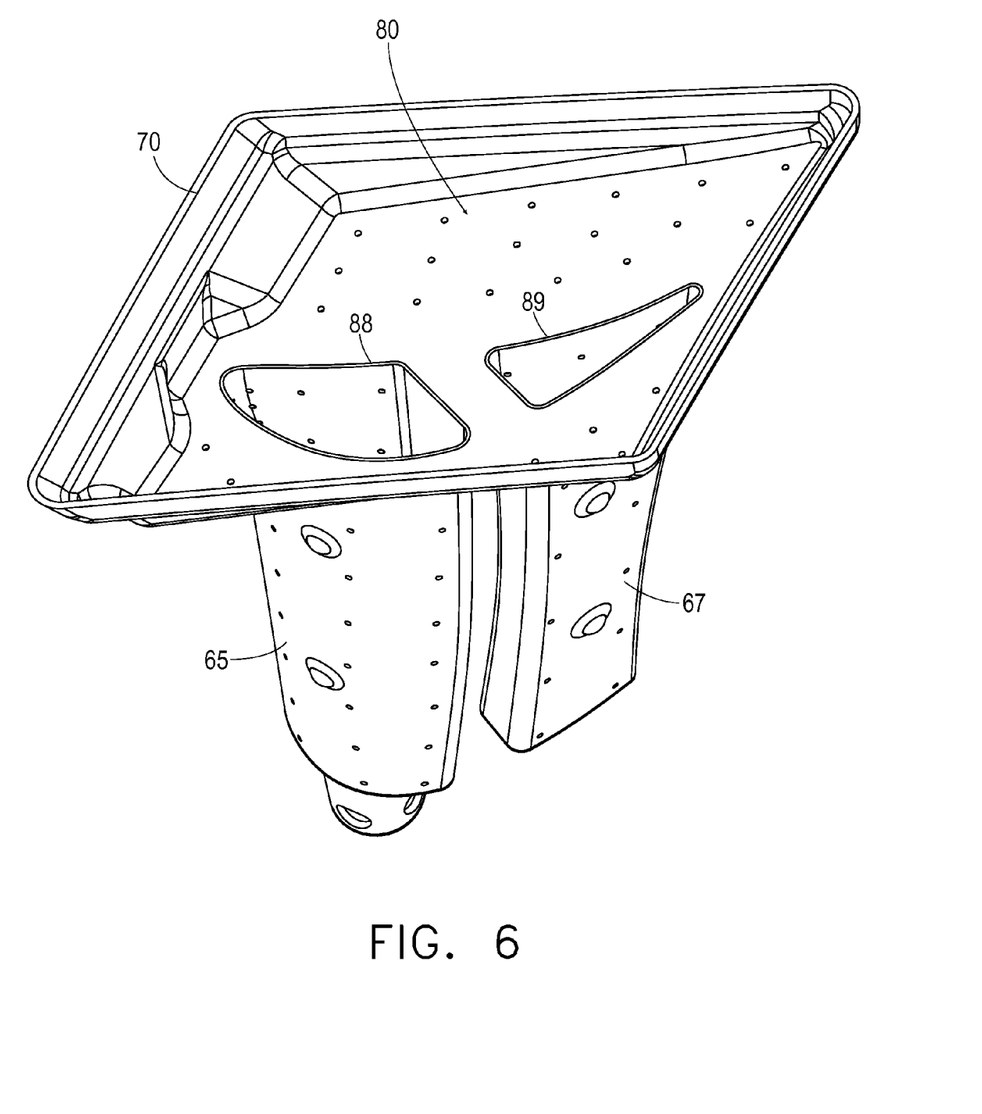
FIG. 6 is a perspective view of an impingement baffle assembly including impingement inserts.

An impingement baffle assembly 68, best seen in FIGS. 4 and 5, is mounted to the outer band segment 50. The impingement baffle assembly 68 includes a four-sided frame 70 with a forward edge 72, aft edge 74, and spaced-apart side edges 76.

The impingement baffle assembly 68 also includes an impingement baffle 80 extending radially inward from the frame 70. The impingement baffle 80 may be integral to the frame 70 or it may be a separate component joined to it. In the illustrated example the impingement baffle 80 includes forward and aft walls 82 and 84 formed into a shallow "V" shape, and spaced-apart side walls 86. The aft wall 84 has forward and aft openings 88 and 89 formed therein shaped and sized to receive the impingement inserts 65 and 67, respectively. In this example the openings 88 and 89 are airfoil-shaped. A plurality of impingement holes 90 are formed through the impingement baffle 80.

FIG. 3 shows the impingement baffle assembly 68 mounted to the outer band segment 50. The forward edge 72 of the frame 70 mates with the forward rail 54 of the outer band segment 50 and the aft edge 74 of the frame 70 mates with the aft rail 56 of the outer band segment 50. An impingement cavity 79 is defined between the impingement baffle 80 and the outer band segment 50. The impingement inserts 65 and 67 mate with the openings 88 and 89, respectively, of the impingement baffle 80. The impingement baffle assembly 68 is secured to the outer band segment 50, for example by brazing or welding around the perimeter of the frame 70, It is noted that the "high wall" configuration of the end faces 58, incorporating outer rails 61, provides a complete perimeter for sealing of the frame 70 to the outer band segment 50 without the need for a lap joint between the two components, and is not especially sensitive to the radial position of the frame 70. A perimeter braze or weld operation around the outside diameter of the impingement inserts 65 and 67 to the openings 88 and 89 interface ensures no direct leakage path for pre-impingement air. For manufacturing purposes, the frame 70, impingement baffle 80, and the impingement inserts 65 and 67 may be provided as an inseparable assembly (seen in FIG. 5) which is then assembled to the outer band segment 50. The bottom or radially-inner surface of the impingement baffle 80 may also be brazed or otherwise bonded to the raised boss 51 along a closed path, so as to prevent leakage of air from the interior of the vane 30 into the impingement cavity 79.

This "high wall" sealing configuration of the end faces 58, incorporating inner and outer rails 59 and 61 provides a redundant approach to end gap sealing that effectively minimizes a higher pressure, pre-impingement air leakage path. As a result, no additional leak path is introduced as a result of the including of the impingement cavity 79 that is exposed through the "windows" between inner and outer rails 59 and 61.

In operation, compressor discharge air, or another suitable cooling air flow, is ducted to the shroud support 48 in a known manner. The cooling air enters the area outboard of the impingement baffle assembly depicted by the arrow labeled "C" in FIG. 1. A portion of this "pre-impingement" air flow through the openings 88 and 89 into the impingement inserts 65 and 67. Another portion of the pre-impingement air exits the impingement holes 90 as a series of jets which impinge against the outer band segment 50 and cool it. The spent impingement air ("post-impingement air") may then be routed through appropriate holes and used for other purposes such as purging through the forward and aft rails 54 and 56, or film cooling through the outer band segment 50. The openings 88 and 89 are isolated from direct fluid communication with the impingement cavity 79.

This configuration offers several advantages. By integrally joining the impingement baffle assembly 68 to the outer band segment 50, the outer band segment 50 can be impingement cooled using high pressure air without the associated inter-segment leakage penalties.

The present invention replaces the conventional impingement ring assembly commonly utilized in commercial high pressure turbine stator assemblies. Elimination of the impingement ring assembly is likely to improve ease of assembly by reducing overall part count and complexity. In addition, observed field durability and wear issues specific to the impingement ring assembly are thereby mitigated with the alternative implementation of the invention.

The foregoing has described cooling arrangements for a turbine nozzle. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A turbine nozzle segment comprising:
   an arcuate outer band segment;
   an airfoil-shaped turbine vane extending radially inward from the outer band segment, the turbine vane having a hollow interior;
   an impingement baffle assembly secured to the outer band so as to define an impingement cavity in cooperation with the outer band segment, wherein the impingement baffle assembly has at least one impingement hole formed therein which is arranged to direct cooling air at the outer band segment; and
   at least one impingement insert having at least one impingement hole formed therein disposed in the interior of the turbine vane, the at least one impingement insert mating with an opening in the impingement baffle assembly such that the at least one impingement insert is isolated from direct fluid communication with the impingement cavity;
   wherein the impingement baffle assembly includes a perimeter frame and an impingement baffle extending radially inward from the frame; and
   wherein the outer band segment includes a central portion, an arcuate, radially-outwardly-extending forward rail, and an arcuate, radially-outwardly-extending aft rail; and
   the forward rail, the central portion, and the aft rail all terminate at a common side face on each lateral side of the outer band segment; and
   each of the side faces of the outer band segment defines spaced-apart radially inner and outer rails with an open window therebetween that exposes the impingement cavity.

2. The turbine nozzle segment of claim 1 wherein each side face includes at least one seal slot formed therein configured to receive a spline seal.

3. The turbine nozzle segment of claim 2 wherein the impingement baffle assembly is brazed to the outer band.

4. The turbine nozzle segment of claim 1 wherein the frame includes a forward edge, an aft edge, and spaced-apart side edges, the forward edge mating with the forward rail of the outer band segment and the aft edge mating with the aft rail of the outer band segment.

5. The turbine nozzle segment of claim 1 further comprising forward and aft impingement inserts which are received in the interior of the turbine vane, and mate with forward and aft openings, respectively, of the impingement baffle assembly.

6. The turbine nozzle segment of claim 1 wherein the impingement insert has an airfoil cross-sectional shape.

7. The turbine nozzle segment of claim 1 wherein the impingement baffle has a plurality of impingement holes formed therein.

8. The turbine nozzle segment of claim 1 wherein the impingement insert is brazed to the impingement baffle.

9. The turbine nozzle segment of claim 1 further comprising an arcuate inner band segment disposed at a radially inner end of the turbine vane.

10. A turbine nozzle assembly for a gas turbine engine, comprising:
    a plurality of turbine nozzle segments arranged in an annular array, each turbine nozzle segment comprising:
      an arcuate outer band segment;
      an airfoil-shaped turbine vane extending radially inward from the outer band segment, the turbine vane having a hollow interior;
      an impingement baffle assembly secured to the outer band so as to define an impingement cavity in cooperation with the outer band segment, wherein the impingement baffle assembly has at least one impingement hole formed therein which is arranged to direct cooling air at the outer band segment; and
      at least one impingement insert having at least one impingement hole formed therein disposed in the interior of the turbine vane, the at least one impingement insert mating with an opening in the impingement baffle assembly such that the at least one impingement insert is isolated from direct fluid communication with the impingement cavity; and
    an annular supporting structure surrounding the turbine nozzle segments;
    wherein the impingement baffle assembly includes a perimeter frame and an impingement baffle extending radially inward from the frame; and
    wherein each outer band segment includes a central portion, an arcuate, radially-outwardly-extending forward rail, and an arcuate, radially-outwardly-extending aft rail; and
    the forward rail, the central portion, and the aft rail all terminate at a common side face on each lateral side of the outer band segment;

and each of the side faces of each outer band segment defines spaced-apart radially inner and outer rails with an open window therebetween that exposes the impingement cavity.

11. The turbine nozzle assembly of claim 10 wherein each side face includes at least one seal slot formed therein configured to receive a spline seal.

12. The turbine nozzle assembly of claim 10 wherein each frame includes a forward edge, an aft edge, and spaced-apart side edges, the forward edge mating with the forward rail of the associated outer band segment and the aft edge mating with the aft rail of the associated outer band segment.

13. The turbine nozzle assembly of claim 10 further comprising forward and aft impingement inserts which are received in the interior of the turbine vane, and mate with forward and aft openings, respectively, of the impingement baffle assembly.

14. The turbine nozzle assembly of claim 10 wherein each opening has an airfoil cross-sectional shape.

15. The turbine nozzle assembly of claim 10 wherein each impingement baffle has a plurality of impingement holes formed therein.

16. The turbine nozzle assembly of claim 10 wherein the impingement baffle assembly is brazed to the outer band.

17. The turbine nozzle assembly of claim 10 wherein each opening is brazed to the associated impingement baffle.

18. The turbine nozzle assembly of claim 10 further comprising an arcuate inner band segment disposed at a radially inner end of each turbine vane.

\* \* \* \* \*